Dec. 14, 1948.  S. MYERSON  2,456,141
APPARATUS FOR EXTRUSION MOLDING OF PLASTIC ARTICLES
Filed May 6, 1946  2 Sheets-Sheet 2

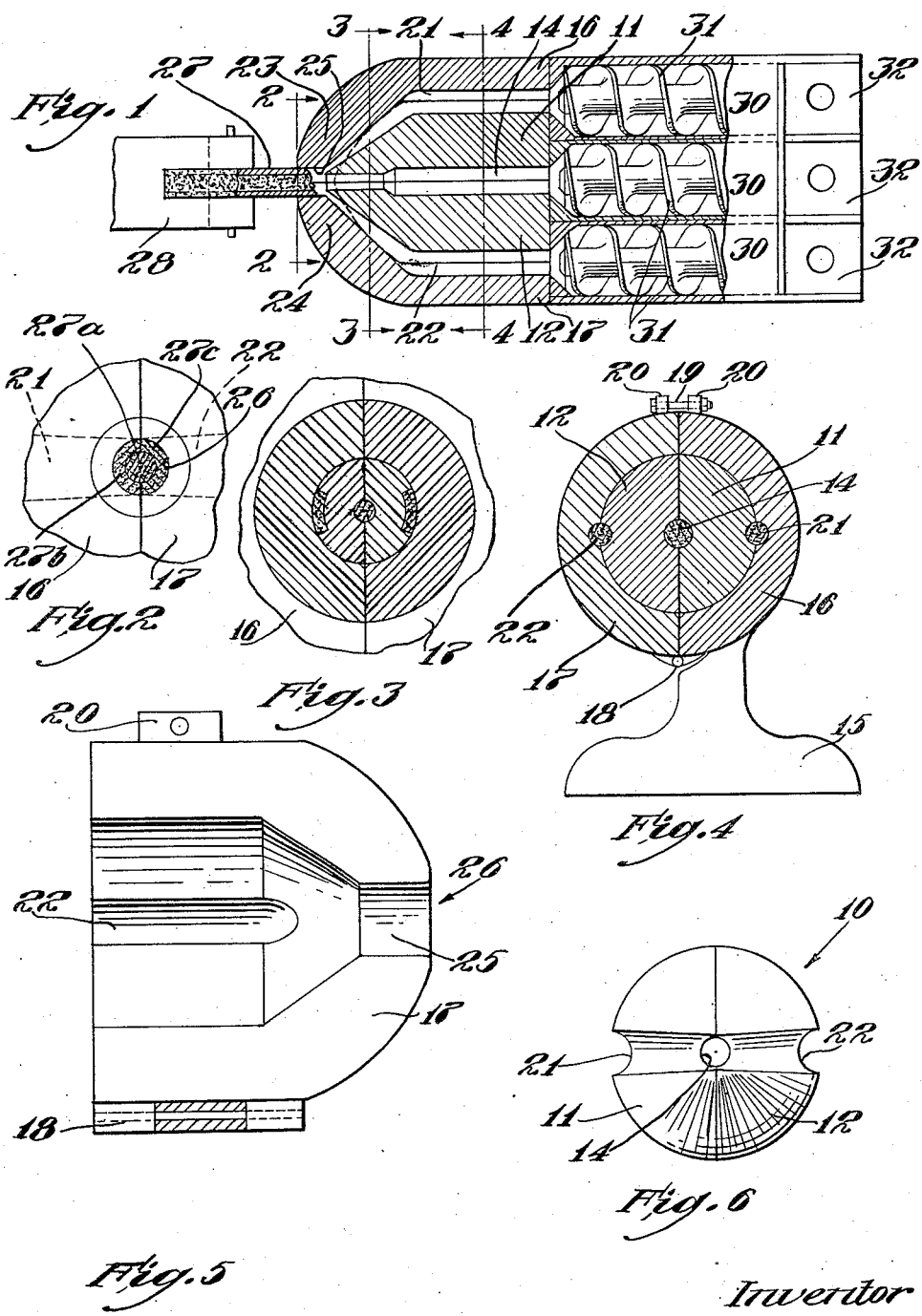

Inventor
Simon Myerson
by Roberts Cushman & Grove
Att'ys.

Patented Dec. 14, 1948

2,456,141

UNITED STATES PATENT OFFICE 2,456,141

APPARATUS FOR EXTRUSION MOLDING OF PLASTIC ARTICLES

Simon Myerson, Brookline, Mass.

Application May 6, 1946, Serial No. 667,668

6 Claims. (Cl. 18—12)

This invention relates to a novel apparatus and method for manufacturing plastic articles by extrusion moulding and it is particularly adapted to the manufacture of such articles which have a plurality of united layers, some of the materials of which have different characteristics.

In the past such articles have been extruded as separate pieces and joined by cementation. By means of this invention, I can simultaneously extrude and join articles comprising a plurality of layers in a great variety of relationships to each other. For example, the different layers may be extruded in simple lateral parallel relationship to each other or they may each contact one or more other members.

Materials having different color characteristics, or different physical characteristics other than color, or different chemical characteristics, may be blended together in a great variety of patterns. For example, a bar may be produced, the cross section of which is such that artificial teeth having a plurality of layers may be readily produced from said bar. Though I have illustrated in the drawings a machine having screw-type extrusion apparatus, the apparatus of this invention may be used as a fixture which may be joined to one or more extrusion machines such as are on the market today.

By means of the apparatus here disclosed, a plurality of materials may be extruded to form external and internal layers, the external layers completely surrounding the internal layer or layers if so desired.

The means for so extruding and joining a plurality of different layers is so constructed as to facilitate cleaning of the machine after each use or run. My apparatus is so constructed that between runs each chamber or passage can be opened into non-retentive portions from which the plastic material may be readily removed.

An object of this invention is to provide an apparatus capable of use in manufacturing such plastic articles which may be readily disassembled for complete access for cleaning of the walls of the passages through which the plastic flows during manufacture of the article.

A further object is to provide such an apparatus which is economical in use and operation and which is cheap to manufacture.

The apparatus of this invention is adapted for use with such thermoplastic or "cold set" plastics and with such thermosetting or "hot set" plastics as are adaptable for use in extrusion moulding. Examples of the first class are methyl methacrylate, polystyrene, cellulose acetate, ethyl cellulose, vinyl chloride and vinyl acetate copolymer. Examples of the second class are certain of the phenolics and of the ureas. The term "plastics" as used in this specification and in the attached claims includes such thermosetting and thermoplastic plastics but natural rubber is specifically excluded from the term plastic as used herein.

According to the preferred form of this invention, I provide an apparatus having an intermediate member which is interposed between two or more side members. All or some of the passages which serve as conduits for the tributary streams of plastic materials may be formed between the side faces of the intermediate member and the inner faces of the side members so that when the side members are moved away from the intermediate member, the walls of the passages are completely exposed for cleaning. In one aspect of the invention, the intermediate member preferably is made with side walls which converge at the forward end of the intermediate member and the forward portions of the inner faces of the side members preferably abut said converging side walls and said faces converge to form the passage for the common stream adjacent to the forward end of the intermediate member. Upon movement of the side members away from the intermediate member, the walls of the passages are completely exposed for cleaning.

In another aspect of the invention, the intermediate member at its forward end is provided with a frusto-conical portion. The intermediate member may have a jacket or side member closely fitted to its sides. This jacket may be one solid piece or it may be split in two or more parts. The cross-section of this apparatus may be circular, rectangular or of other cross-sectional shape and it is unnecessary that the jacket or side member completely surround the intermediate member. For this reason, I usually refer to one as the intermediate member (whether or not it is composed of more than one part) and to the other as side members whether or not they constitute a complete jacket.

In one aspect of the invention, the intermediate member may be formed with an axial passage which may be utilized to form the axial portion of the completed article. In such embodiment the intermediate member may be formed in two or more parts which may be separated to expose the walls of the axial passage for cleaning. The other tributary passages may be formed between the side wall or walls of the intermediate member and the inner wall or walls of the side members, these passages extend along the outer sides of the cylindrical portion and of the frusto-conical portion of the intermediate member and converge about the periphery of the axially extending passage.

Thus I have provided a novel apparatus for the simultaneous extrusion and joining of layers of plastic materials of different characteristics which apparatus permits ready access for cleaning the walls of the passages by merely disassembling the side members and the two or more parts of the intermediate member.

For the purposes of illustration typical embodiments of the invention are shown in the accompanying drawings in which:

Fig. 1 is a plan view of an apparatus embodying the invention, parts being broken away and shown in central horizontal section;

Fig. 2 is an enlarged section taken on the line 2—2 of Fig. 1;

Fig. 3 is an enlarged section taken on the line 3—3 of Fig. 1;

Fig. 4 is a section taken on the line 4—4 of Fig. 1;

Fig. 5 is an enlarged side elevation looking at the inner face of one of the side members;

Fig. 6 is an end view looking at the frusto-conical portion of the intermediate member;

Figure 7:
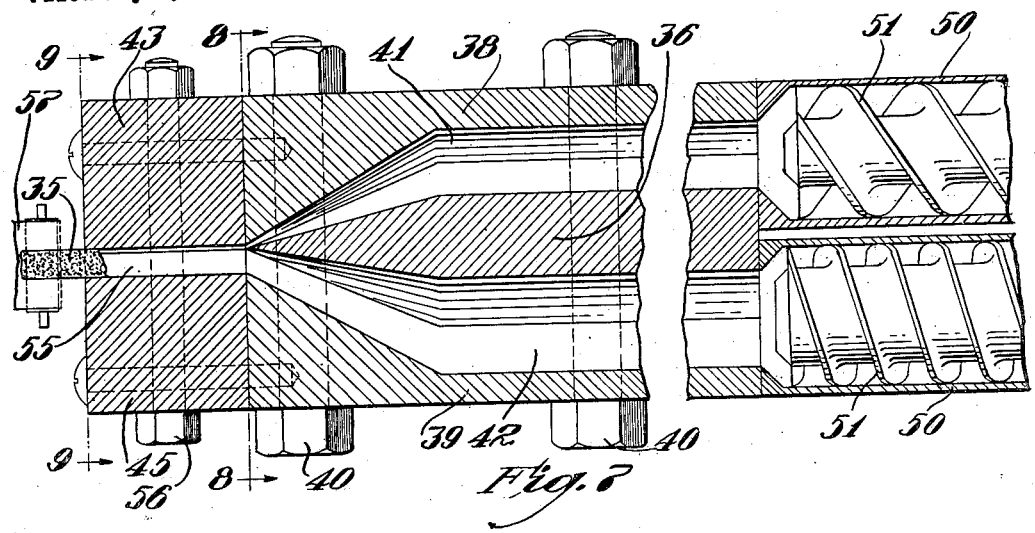
Fig. 7 is a plan view of another embodiment, parts being broken away and shown in central horizontal section.
Figures 8, 9:
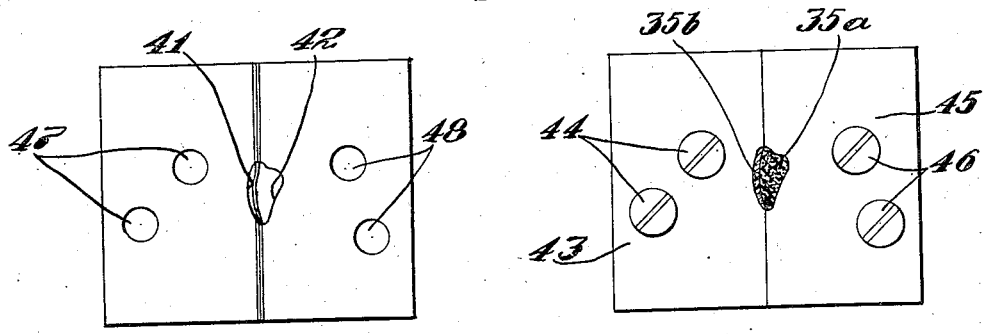
Fig. 8 is a section on the line 8—8 of Fig. 7.
Fig. 9 is a section of the line 9—9 of Fig. 7.
Figure 10:
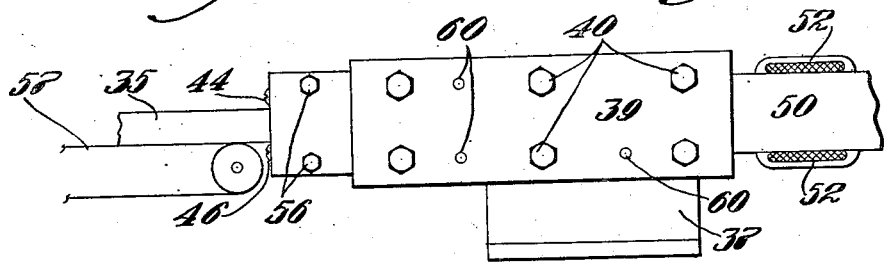
Fig. 10 is a side elevation of the apparatus of Fig. 7.

The particular embodiment chosen for the purpose of illustration in Figs. 1 to 6, inclusive, consists of two side members 16 and 17 and an intermediate member 10 (Fig. 6) the latter member consisting of the two parts 11 and 12. The intermediate member 10 consists of a cylindrical portion and a frusto-conical portion as shown in Fig. 1. An axial passage 14 extends from end to end of the intermediate member 10, this passage being of restricted cross-sectional area at the end toward the frusto-conical portion of the intermediate member.

The side members 16 and 17 surround the side walls of the intermediate member 10. The side member 16 is secured to the support 15 and the side member 17 is pivotally secured to the side member 16 by the hinge 18 (Fig. 4). The bolt 19 passing through apertures in the lugs 20 serves detachably to hold the side members 16 and 17 in a position wherein their inner faces abut the side faces of the intermediate member 10. A passage 21 is formed between the side wall of the member 11 and the side wall of the side member 16 and a corresponding passage 22 is formed between the side wall of the side member 17 and the side wall of the side member 17. As shown in Fig. 1, these passages gradually decrease in cross-sectional area as they approach the end of the frusto-conical portion of the intermediate member.

A portion 23 of the side member 16 and a portion 24 of the side member 17 extends beyond the end of the frusto-conical portion of the intermediate member 10. These extension portions serve to form the walls of the extrusion passage 25 which extends from the junction of the passages 14, 21 and 22 through these extension portions to the orifice 26. The cross-sectional area of the passage 25 is slightly less than the aggregate of the cross-sectional area of the passages 14, 21 and 22 adjacent to their junctions with the passage 25. Although the passage 25 as illustrated in Figs. 1 to 5 is relatively short, it may be elongated to any desired length by varying the lengths of the portions 23 and 24 or by adding detachable extension members similar to the members 43 and 45 shown in Figs. 7 to 10 of the drawings. This passage 25 may be of gradually reduced cross-sectional area from the end adjacent to passages 21 and 22 toward the extrusion orifice 26. A plurality of such extension members and of such passages may be provided, the extrusion orifice of each being of a size different from the size of others, if desired. This extension portion of the apparatus may contain a heating device to produce a gradually decreasing temperature towards the orifice.

The conveyor belt 28 is located adjacent to the extrusion orifice 26 and it is adapted to receive and continuously advance the moulded article 27 at substantially its speed of extrusion from the orifice. Appropriate cooling means (not shown) may be provided adjacent to the conveyor belt.

Separate compression chamber housings 30 are provided one for each of the passages 14, 21 and 22. Each of these compression chamber housings may be detachably secured to the corresponding portions of the intermediate member 10 and the side members 16 and 17 by any suitable means (not shown). Heating elements (not shown) are provided to heat the forward ends of the compression chambers and the walls of the passages 14, 21 and 22. A screw-type conveyor 31 is provided in the bore of each compression chamber 30 and each conveyor is continuously rotated by any suitable source of power (not shown). Hoppers 32 are provided for continuously feeding supplies of plastic materials to the respective compression chambers.

In operation a plastic having, for example, one color characteristic, is fed to the compression chamber communicating with the passage 14, a plastic having another color characteristic is fed to the compression chamber communicating with the passage 21, and a plastic having still another color characteristic is fed to the compression chamber communicating with the passage 22. The screw conveyors continuously move the plastic materials into and through the heated forward ends of the compression chambers and into and through the passages 14, 21 and 22, the passage 25 and through the orifice 26. The stream emerging from the passage 14 into the passage 25 is circular in cross section. The streams emerging from the passages 21 and 22 extend around the periphery of the circular stream as they merge with it and with each other at the entrance to the passage 25. As shown in Fig. 2, the stream emerging from the passage 14 forms the axially extending cylindrical portion 27ᵃ of the extruded product, the stream emerging from the passage 21 forms the portion 27ᵇ of the outer cylindrical shell of the product and the stream emerging from the passage 22 forms the portion 27ᶜ of the outer cylindrical shell of the product.

For example, if a black methyl methacrylate is fed to the passage 14, a red methyl methacrylate to the passage 21 and a green methyl methacrylate to the passage 22, the portion 27ᵃ will be black, the portion 27ᵇ will be red and the portion 27ᶜ will be green. If both 21 and 22 are of the same material, e. g., clear, then the bar formed will have a central core of black surrounded by a shell of clear material. If the shell be of varying thickness of varying transparency of material, a variety of color effects may be produced at the surface of the bar.

Different combinations of heat and pressure may be used in the compression chambers for operating with the same material and different ranges of heat and pressure may be used for different kinds of plastic materials.

To clean the walls of the passages 14, 21, 22 and 25 between runs, the bolt 19 is removed and the side member 17 is swung outwardly about the hinge 18. The intermediate member 10 is then removed and separated into its two parts 11 and 12. This frees the walls of the passage 14 for cleaning, and it also frees the walls of passages 21, 22 and 25 for cleaning. As many passages as are desired may be located between the inner walls of the members 16 and 17 and the side wall of the member 10, and each of these passages will be freed for cleaning by the foregoing simple operation.

The apparatus illustrated in Figs. 7 to 10 inclusive, is adapted to make an article, the cross section of which is similar to a longitudinal section of an anterior tooth, the portion 35a of such article corresponds to the body portion of the tooth and the portion 35b corresponds to the enamel portion of the tooth.

The intermediate member 36 is secured to the base 37. At its forward end the sides of the intermediate member 36 converge as shown in Fig. 7. A pair of side members 38 and 39 are detachably secured adjacent to the sides of the intermediate member 36 by a series of bolts 40. Guide pins secured to the sides of the intermediate member 36 slidably fit in the passages 50 which extend through the side members 38 and 39 to assure accurate positioning of the side and intermediate members in assembled position. Longitudinal passages 41 and 42 are formed between the adjacent sides of the intermediate member 36 and the side members 38 and 39. As shown in Fig. 7, these passages are of reduced cross-sectional area where they join each other adjacent to the ridge which is formed by the converging sides of the intermediate member 36.

An extension member 43 is detachably secured by screws 44 to the end of the side member 38. A corresponding extension member 45 is secured by the screws 46 to the end of the side member 39. Interiorly threaded passages 47 and 48 are provided in the ends of the side members 38 and 39 to receive the exteriorly threaded ends of the screws 44 and 46.

The extrusion passage 55 is formed between the abutting side walls of the extension members 43 and 45. These walls are held in closely abutting relationship by the bolts 56. A conveyor 57 continuously advances the plastic article 35 as it is extruded from the orifice at the end of the passage 55.

The cross-sectional area of the passage 55 is slightly less than the aggregate of the cross-sectional areas of the passages 41 and 42 adjacent to their junction with the passage 55. As previously described, the apparatus may be equipped with additional extension members similar to the extension members 43 and 45 to provide additional passages like the passage 55 and additional orifices, and such passages and orifices may vary in size and shape. These extension members may also be equipped with heating apparatus.

A pair of compression chambers 50 are each provided with a screw-type conveyor 51 and a hopper (not shown). One of these compression chambers is preferably detachably secured adjacent to the end of the passage 41 and the other preferably detachably secured adjacent to the end of the passage 42. The screw-type conveyors are continuously driven in the same direction by any suitable source of power (not shown). Each compression chamber is provided with heating elements 52.

A plastic material having the appropriate characteristics to form the body portion of an artificial tooth is fed to the compression chamber communicating with the passage 42 and a plastic material having the appropriate characteristics to form the enamel portion of an artificial tooth is fed to the compression chamber communicating with the passage 41. The conveyors 51 continuously move these plastic materials into and through the heated forward ends of the compression chambers into and through the passages 41 and 42, the passage 55 and the extrusion orifice which is at the forward end of the latter passage, and thence to the conveyor, 57.

The passages 41, 42 and 55 may be opened for cleaning by removing the bolts 40 and 56 and then removing the side members 38 and 39 from the intermediate member 36 which remains supported on the base 37. The walls of these passages which are thus exposed are readily accessible for cleaning and they present no undercut or obstructed surfaces. More than one passage may be formed between each of the side members and the intermediate member.

When the term "between" is used herein and in the following claims, to describe the location of a passage, it is not to be restricted to meaning that each member is necessarily provided with a groove or a channel to form part of the wall of the passage. For example the forward end of the passage 21 is between the side member 16 and the interemediate member 11 but no groove is formed in the forward sloping wall of the side member 16.

Although I have illustrated and described the side members 16 and 17 as surrounding and abutting the intermediate member 10 and the member 10 as consisting of two parts, it is obvious that the members 16 and 17 may be united into a single piece and likewise the member 10 may be made in one piece, although this would be at some sacrifice to the facility for cleaning the passageways formed therein.

I claim:

1. Apparatus for moulding a relatively inelastic plastic article from a plurality of substantially inelastic plastic materials having different characteristics which comprises an extrusion passage terminating in an extrusion orifice, said extrusion passage being formed throughout its length between the adjacent surfaces of a plurality of abutting die members which, upon separation, divide the wall of said passage into fully exposed segments thereby to expose said wall for cleaning throughout its length, a plurality of compression chambers, a plurality of feeder passages, each feeder passage extending from the emission end of a compression chamber to said extrusion passage, each of said feeder passages being formed throughout its length between the adjacent surfaces of a plurality of abutting die members, which, upon separation, divide the wall of said passage into fully exposed segments, thereby to expose said wall for cleaning throughout its length, means in said compression chambers operative to force the plastic materials from said chambers through said feeder passages, the extrusion passage and the extrusion orifice, and holding means adapted releasably to hold said die member in said assembled relationship.

2. Apparatus for moulding a relatively inelastic plastic article from a plurality of substantially inelastic plastic materials having different characteristics which comprises an extrusion passage terminating in an extrusion orifice, said extrusion passage being formed throughout its length between the adjacent surfaces of a plurality of abutting die members which, upon separation, divide the wall of said passage into fully exposed segments thereby to expose said wall for cleaning throughout its length, a plurality of compression chambers, a plurality of feeder passages, each feeder passage extending from the emission end of a compression chamber to said extrusion passage, the aggregate of the cross sectional areas of said feeder passages adjacent to their junctions with the extrusion passage being greater than the cross sectional area of the extrusion passage and each of said feeder passages being formed throughout its length between the adjacent surfaces of a plurality of abutting die members, which, upon separation, divide the wall of the feeder passage into fully exposed segments, thereby to expose said wall for cleaning throughout its length, means in said compression chambers operative to force the plastic materials from said chambers through said feeder passages, the extrusion passage and the extrusion orifice, and holding means adapted releasably to hold said die member in said assembled relationship.

3. Apparatus for moulding a relatively inelastic plastic article from a plurality of substantially inelastic plastic materials having different characteristics which comprises an extrusion passage terminating in an extrusion orifice, said extrusion passage being formed throughout its length between the adjacent surfaces of a plurality of abutting die members which, upon separation, divide the wall of said passage into fully exposed segments thereby to expose said wall for cleaning throughout its length, a plurality of compression chambers, a plurality of feeder passages, each feeder passage extending from the emission end of a compression chamber to said extrusion passage, each of said feeder passages being formed throughout its length between the adjacent surfaces of a plurality of abutting die members, which, upon separation, divide the wall of said passage into fully exposed segments, thereby to expose said wall for cleaning throughout its length, means in said compression chambers operative to force the plastic materials from said chambers through said feeder passages, the extrusion passage and the extrusion orifice, means for heating the plastic materials to effect bonding thereof in the extrusion passage, and holding means adapted releasably to hold said die member in said assembled relationship.

4. Apparatus for moulding a relatively inelastic plastic article from a plurality of substantially inelastic plastic materials having different characteristics which comprises an extrusion passage terminating in an extrusion orifice, said extrusion passage being formed throughout its length between the adjacent surfaces of a plurality of abutting die members which, upon separation, divide the wall of said passage into fully exposed segments thereby to expose said wall for cleaning throughout its length, a plurality of compression chambers, an intermediate die member extending from adjacent to the forward ends of said compression chambers to the emission end of said extrusion passage, a plurality of feeder passages, each feeder passage extending from the emission end of a compression chamber to said extrusion passage, each of said feeder passages being formed throughout its length between an outer surface of said intermediate die member and an inner surface of an outer die member, whereby upon separation of said die members the wall of said feeder passage is divided into fully exposed segments, thereby to expose said wall for cleaning throughout its length, means in said compression chambers operative to force the plastic materials from said chambers through said feeder passages, the extrusion passage and the extrusion orifice, means for heating the plastic materials to effect bonding thereof in the extrusion passage, and holding means adapted releasably to hold said die member in said assembled relationship.

5. Apparatus for moulding a relatively inelastic plastic article from a plurality of substantially inelastic plastic materials having different characteristics which comprises an extrusion passage terminating in an extrusion orifice, said extrusion passage being formed throughout its length between the adjacent surfaces of a plurality of abutting die members which, upon separation, divide the wall of said passage into fully exposed segments, thereby to expose said wall for cleaning throughout its length, a plurality of compression chambers, an intermediate die member having outer faces which converge at the entrance end of said extrusion passage and extend thence to adjacent to the emission ends of said compression chambers, a plurality of side die members, a plurality of feeder passages, each of said feeder passages extending from the emission end of a compression chamber to said extrusion passage, each of said feeder passages being formed throughout its length between an outer surface of the intermediate die member and an inner surface of a side die member, whereby upon separation of said intermediate and side die members the wall of said feeder passage is divided into fully exposed segments, thereby to expose said wall for cleaning throughout its length, means in said compression chambers operative to force the plastic materials from said chambers through said feeder passages, the extrusion passage and the extrusion orifice, means for heating the plastic materials to effect bonding thereof in the extrusion passage, and holding means adapted releasably to hold said die members in said assembled relationship.

6. Apparatus for moulding a relatively inelastic plastic article from a plurality of substantially inelastic plastic materials having different characteristics which comprises an extrusion passage terminating in an extrusion orifice, said extrusion passage being formed throughout its length between the adjacent surfaces of a plurality of abutting die members which, upon separation, divide the wall of said passage throughout its length into fully exposed segments, thereby to expose said wall for cleaning throughout its length, a plurality of compression chambers, an intermediate die member extending from adjacent to the emission ends of said compression chambers to the entrance end of said extrusion passage, a plurality of side die members, a plurality of longitudinally extending feeder passages, each of said feeder passages extending from the emission end of a compression chamber to said extrusion passage, each of said feeder passages being formed throughout its length between an outer surface of the intermediate die member and an inner surface of a side die member, whereby upon separation of said intermediate and side die members the wall of said feeder passage is divided throughout its length into fully exposed segments, thereby to expose said wall for cleaning throughout its length, means in said compression chambers operative to force the plastic materials from said chambers through said feeder passages, the extrusion passage and the extrusion orifice, means for heating the plastic materials to effect bonding thereof in the extrusion passage, and holding means adapted releasably to hold said die members in said assembled relationship.

SIMON MYERSON.

REFERENCES CITED

The following references are of record in the file of this patent:

UNITED STATES PATENTS

| Number | Name | Date |
|---|---|---|
| 72,393 | Hale | Dec. 17, 1867 |
| 277,707 | Gonon | May 15, 1883 |
| 279,131 | Chase | June 12, 1883 |
| 575,888 | Hill | Jan. 26, 1897 |
| 817,080 | Mahoney | Apr. 3, 1906 |
| 1,322,464 | Oden | Nov. 18, 1919 |
| 1,660,514 | Lorentz | Feb. 28, 1928 |
| 2,138,378 | Johnson | Nov. 29, 1938 |